United States Patent [19]

Tixier

[11] 3,862,123

[45] Jan. 21, 1975

[54] CINCHONA ALKALOID SALTS AND COMPOSITIONS CONTAINING THEM

[75] Inventor: René Tixier, Paris, France

[73] Assignee: Societe Generale De Recherches Et D'Applications Scientifiques "Sageras", Paris, France

[22] Filed: July 8, 1971

[21] Appl. No.: 160,919

Related U.S. Application Data

[62] Division of Ser. No. 843,001, July 18, 1969.

[52] U.S. Cl. ...... 260/234 R, 260/209 R, 260/234 D, 424/180
[51] Int. Cl. ............................................. C07c 69/32
[58] Field of Search ......... 260/234 R, 234 D, 209 R

[56] References Cited
UNITED STATES PATENTS 2,959,583  11/1960  Doczi ............................ 260/234 R
3,175,942  3/1965   Anderson et al ................ 260/234 R
3,578,657  5/1971   Ricard et al. ................... 260/234 R

*Primary Examiner*—Johnnie R. Brown
*Attorney, Agent, or Firm*—John G. Schwartz

[57] ABSTRACT

A salt of a cinchona alkaloid and a natural or synthetic polysaccharide sulphate in which the cinchona alkaloid is quinidine, hydroquinidine, quinicine, cinchonicine, hydroquinicine or hydrocinchonicine and the polysaccharide sulphate is galactane sulphate or carraghenate, galactoglucane sulphate or furcellarane, dextran sulphate or arabogalactane sulphate. The salts are substantially insoluble in water and their oral administration results in a gradual liberation of the active principle during passage through the intestines increasing the duration of action. These salts have antipyretic, antimalarial, antispasmodic and antiarrhythmic activity.

15 Claims, 4 Drawing Figures

CINCHONA ALKALOID SALTS AND COMPOSITIONS CONTAINING THEM

This application is a Division of application Ser. No. 843,001 filed Jul. 18, 1969.

The present invention is concerned with certain novel cinchona alkaloid salts and with compositions containing them.

Several dozen alkaloids can be extracted from cinchona bark; the principal ones are quinine, quinidine, hydroquinidine, quinicine, cinchonicine, hydroquinicine and hydrocinchonicine. These alkaloids all have pharmacological activity, particularly antipyretic and antimalarial activity, but some also have antispasmodic and antiarrhythmic activity. For this reason, cinchona has been used in medicine for a very long time and more recently the various individual alkaloids have been used for more specific applications. These alkaloids are, however, very soluble in water so that the blood concentration has had to be maintained by repeated administrations in order to obtain a regular and lasting therapeutic action.

We have found that natural or synthetic polysaccharide sulphates combine with these alkaloids to produce salts that are practically insoluble in water. The oral administration of these novel compounds results in a gradual liberation of the active principle during the passage through the intestines, increasing its duration of action.

Suitable natural polysaccharide sulphates include, for example, galactane sulphate or carraghenate (which can be isolated from various algae of the Florideae or Carragaheen family) and galactoglucane sulphate or furcellarane (which can be extracted from Danish agar).

Suitable synthetic polysaccharide sulphates include, for example, dextran sulphate (which can be obtained by esterifying hydrolysed dextran) and arabogalactane sulphate (which can be obtained by sulphating Stractan).

The novel salts are obtained by the salification of the $-SO_3H$ acid functions of these polysaccharides by the alkaloid in question, the alkaloid content of each salt depending on the $-SO_3H$ content of the polysaccharide.

All these salts have physico-chemical properties that make them quite different to the starting alkaloids, in particular a solubility that is entirely modified in the direction of insolubilization. The physiological consequences of this modification as shown by comparative oral administration will be seen hereinafter together with the resulting advantage for the novel salts.

The salts are best produced by a process comprising a double decomposition between a soluble alkali metal salt of the polysaccharide sulphate and a soluble salt of the alkaloid; the desired insoluble salt forms and is precipitated.

The following examples showing the preparation of the salts are given by way of illustration only:

EXAMPLE 1. QUINIDINE GALACTANE SULPHATE 20 g of carraghenate having a sulphate content of from 25 to 25 percent, were suspended in 60 ml of methanol. 9.6 g of 33 percent aqueous sulphuric acid were added with stirring and the suspension was kept at 50°–55°C for 3 hours. The galactane sulphate was filtered off and then suspended again in 60 ml of 80 percent methanol. It was filtered off again and the product was washed three times with 12 ml of methanol. The product was dissolved in 500 ml of water at 60°C with stirring and the pH was adjusted to 6 with N sodium hydroxide. The temperature was maintained at 60°C and 14.8 g of quinidine sulphate containing 86.8 percent of quinidine base were added gradually with stirring. Stirring was continued for 30 minutes at 60°C and the whole was then left to cool to room temperature. After standing overnight, the precipitate was filtered off and washed with 100 ml of water. After a final filtration, it was oven-dried under vacuum at about 60°C. It was then ground and screened to obtain a homogeneous powder.

Yield: 24 g. The quinidine base content of the product was 46 percent on a dry weight basis.

EXAMPLE 2. QUININE GALACTANE SULPHATE

The procedure described in Example 1 was followed, but instead of quinidine sulphate, 15 g of quinine hydrochloride with 2 molecules of water of crystallisation, previously dissolved in 100 ml of water at 60°C, were added.

Yield: 18 g. The quinine base content of the product was 40.8 percent.

EXAMPLE 3. QUINICINE GALACTANE SULPHATE

The procedure described in Example 1 was followed, but 13.8 g of quinicine hydrochloride, previously dissolved in 50 ml of water at 60°C (or 12.6 g of quinicine base) were added instead of quinidine sulphate.

Yield: 25 g. The quinicine base content of the product was 40.8 percent.

EXAMPLE 4. HYDROQUINIDINE GALACTANE SULPHATE

The procedure described in Example 1 was followed, but 13.6 g of hydroquinidine hydrochloride dissolved in 150 ml of water at 60°C (or 12.3 g of hydroquinidine base were added instead of quinidine sulphate.

Yield: 20 g. The hydroquinidine base content of the product was 38.4 percent.

EXAMPLE 5. CINCHONICINE GALACTANE SULPHATE

The procedure described in Example 1 was followed, but 12.4 g of cinchonicine hydrochloride dissolved in 60 ml of water (or 11 g of cinchonicine base) were added instead of quinidine sulphate.

Yield: 23 g. The cinchonicine base content of the product was 41.4 percent.

EXAMPLE 6. HYDROCINCHONICINE GALACTANE SULPHATE

The process described in Example 1 was followed, but 12.4 g of hydrocinchonicine hydrochloride dissolved in 60 ml of water (or 11 g of hydrocinchonicine base) were added instead of quinidine sulphate.

Yield: 22 g. The hydrocinchonicine base content of the product was 40.8 percent.

EXAMPLE 7. HYDROQUINICINE GALACTANE SULPHATE

The process described in Example 1 was followed, but 13.6 g of hydroquinicine hydrochloride dissolved in 70 ml of water (or 12.3 g of hydroquinicine base) were added instead of quinidine sulphate.

Yield: 24 g. The hydroquinicine base content of the product was 39.6 percent.

EXAMPLE 8. QUINIDINE GALACTOGLUCANE SULPHATE

The process described in Example 1 was followed, carraghenate being replaced by furcellarane having a sulphate content of from 15 to 20 percent, and 9 g of quinidine hydrochloride dissolved in 200 ml of distilled water (or 8.10 g of quinidine base being added instead of quinidine sulphate.

Yield: 14 g. The quinidine base content of the product was 33.4 percent.

EXAMPLE 9. QUINIDINE DEXTRAN SULPHATE 10 g of sodium dextran sulphate containing from 14.7 to 17.4 percent of sulphur were dissolved on a water bath at 60°C in 200 ml of distilled water. 19.5 g of quinidine sulphate (or 17 g of quinidine base) were added gradually with continuous stirring. Stirring was continued for 30 minutes on the water bath and the whole was then allowed to cool to room temperature while still stirring. After standing overnight at 4°C, the insoluble product was filtered off and washed with 100 ml of distilled water. It was again filtered and then oven-dried under vacuum at about 60°C. The product was ground and screened to give a homogeneous powder.

Yield: 23.30 g. The quinidine base content of the product was 66 percent.

EXAMPLE 10. QUININE ARABOGALACTANE SULPHATE 10.8 g of calcium arabogalactane sulphate having a sulphate content of from 46 to 48 percent, were dissolved on a water bath at 60°C in 30 ml of water. 12.3 g of quinine hydrochloride having 2 molecules of water of crystallisation (10.1 g of anhydrous base) were dissolved in 100 ml of water at 60°-70°C. The quinine hydrochloride solution was poured gradually with stirring, while the temperature was maintained at 60°C, into the solution of calcium arabogalactane sulphate. Stirring was continued at 60°C for 30 minutes and the whole was then left to cool. After standing overnight at 4°C, the insoluble product was filtered off and washed with 50 ml of distilled water. It was again filtered and oven-dried under vacuum at about 60°C. The product was ground and screened.

Yield: 16 g. The quinine base content of the product was 54.6 percent (or 58 percent of the dry product).

EXAMPLE 11. QUINIDINE ARABOGALACTANE SULPHATE

The procedure described in Example 10 was followed, but 11.1 g of anhydrous quinine hydrochloride (or 10 g of anhydrous base) dissolved in 250 ml of distilled water at 60°C were added instead of quinine hydrochloride.

Yield: 16.8 g. The quinidine base content of the product was 54 percent (or 58 percent of the dry product).

EXAMPLE 12. QUINICINE ARABOGALACTANE SULPHATE

The procedure described in Example 10 was followed, but 11.3 g of quinicine hydrochloride (or 10 g of anhydrous base) dissolved in 50 ml of distilled water at 60°C were added instead of quinine hydrochloride. The pasty precipitate was dehydrated by successive washing with acetone and then oven-dried under vacuum at 60°C. It was ground and screened.

Yield: 16 g. The quinicine base content of the product was 47.9 percent.

EXAMPLE 13. HYDROQUINIDINE ARABOGALACTANE SULPHATE

The procedure described in Example 10 was followed, but 11.3 g of hydroquinidine hydrochloride (or 10 g of anhydrous base) dissolved in 300 ml of distilled water at 60°C were added instead of quinine hydrochloride. The pasty precipitate was dehydrated by successive washing with acetone and then oven-dried under vacuum at 60°C. It was ground and screened.

Yield: 14.5 g. The hydroquinidine base content of the product was 54 percent.

EXAMPLE 14. HYDROQUINICINE ARABOGALACTANE SULPHATE

The process described in Example 10 was followed, but 56 ml of a 20 percent solution of hydroquinicine hydrochloride (or 10.1 g of anhydrous base) were added instead of quinine hydrochloride. The resulting pasty product was directly oven-dried under vacuum at 60°C.

Yield: 16 g. The hydroquinicine base content of the product was 47.6 percent.

EXAMPLE 15. CINCHONICINE ARABOGALACTANE SULPHATE

The process described in Example 10 was followed, but 51 ml of a 20 percent solution of cinchonicine hydrochloride (or 9.10 g of anhydrous base) were added instead of quinine hydrochloride. The pasty product was directly oven-dried under vacuum at 60°C.

Yield: 13.5 g. The cinchonicine base content of the product was 51.6 percent.

EXAMPLE 16. HYDROCINCHONICINE ARABOGALACTANE SULPHATE

The process described in Example 10 was followed, but 51 ml of a 20 percent solution of hydrocinchonicine hydrochloride (or 9.10 g of anhydrous base) were added instead of quinine hydrochloride. The product was directly oven-dried under vacuum at 60°C.

Yield: 14.5 g. The hydrocinchonicine base content of the product was 52.4 percent.

The compounds obtained in the foregoing Examples are in every case only very slightly soluble in water and when they are administered orally, the resulting alkaloid concentrations in the blood are always distinctly higher than with the sulphates of the same alkaloids, as shown by the four pairs of curves reproduced in the accompanying drawings, in which.

Figure 1:
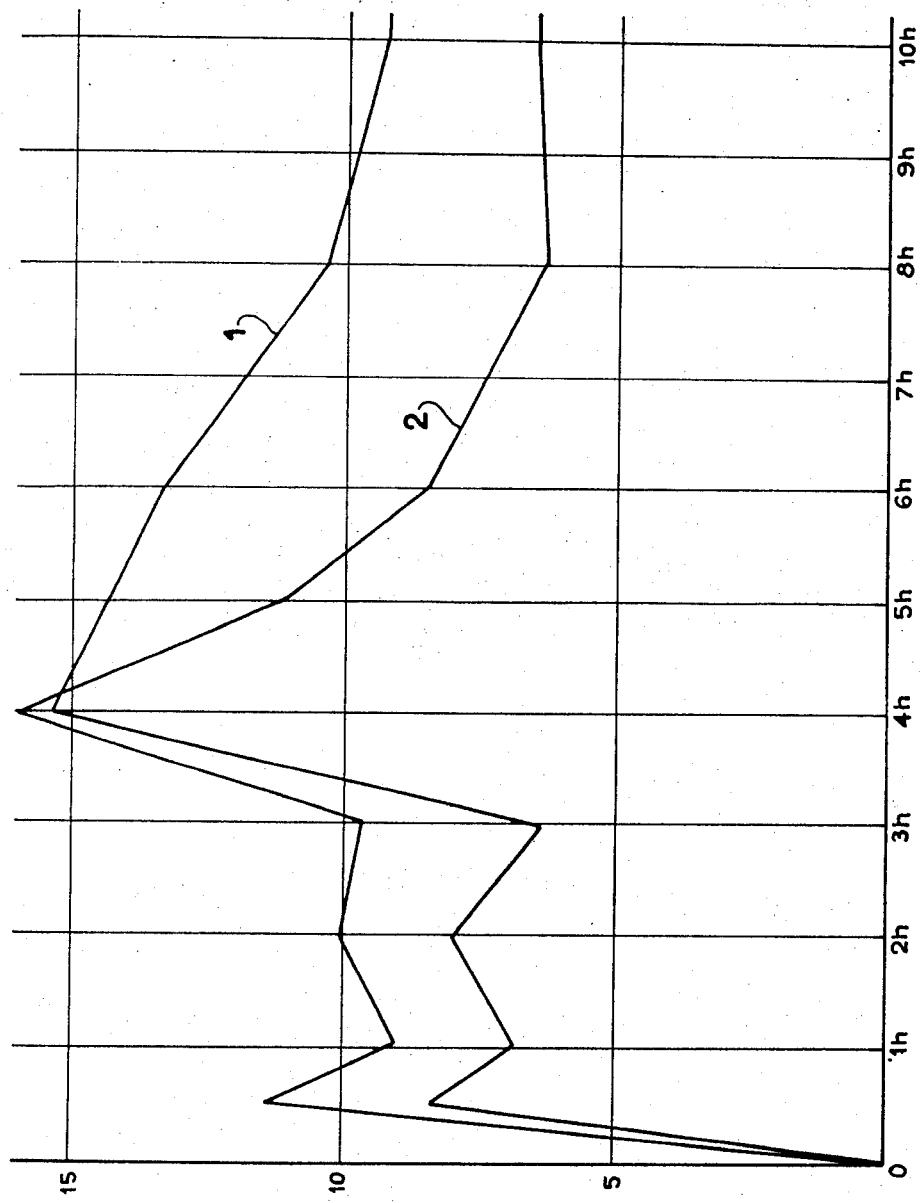
FIG. 1 shows by way of comparison the quinidine content of the blood after the administration of equivalent doses of quinidine galactane sulphate (compound of Example 1) and quinidine sulphate, the curves being drawn according to the trial process A hereinafter.

With reference, first, to FIG. 1, trial process A was carried out as follows. The trials were carried out on rats of Charles River stock having an average weight of 160 g. The two compounds were given orally in doses of 950 mg/kg in the case of quinidine galactane sulphate and 500 mg/kg in the case of quinidine sulphate, so that in both cases the quantity of quinidine base administered was 435 mg/kg. The animals were killed after ½, 1, 2, 3, 4, 5, 6, 8, 10, 18 and 24 hours and the quinidine content of the blood, evaluated in µg/ml, was plotted, as abscissae, against the time, in hours, as ordinates. Curves 1 and 2 therefore show the quinidine level in the blood in µg/ml in dependence on the time in hours, curve 1 relating to animals given quinidine galactane sulphate and curve 2 to animals given quinidine sulphate. The quinidine determination (carried out on 10 animals per point) was effected on the total blood. For this purpose, the blood was mixed with 0.1 percent heparin. An exact volume of blood between 2 and 3 ml was measured and 0.2 ml of 2N soda was added. The test sample was triturated with 10 g of anhydrous sodium sulphate to obtain a homogeneous powder which was extracted with 30 ml of chloroform. The extract was stirred for 15 minutes, filtered, the solid residue was rinsed with 10 ml of chloroform and the chloroform extracts were combined and extracted with 3 ml of 2N sulphuric acid. After stirring for 10 minutes, the aqueous acid solution was collected and its optical density at 350 mµ was determined. A blank control sample was produced under the same conditions. Calculations were carried out in relation to solutions containing known concentrations of quinidine sulphate and the results were expressed as quinidine sulphate per ml of blood.

Comparison of curves 1 and 2 shows the distinct difference between the behaviour of the two compounds administered.

Quinidine sulphate caused a high blood concentration of short duration, the concentration reaching a peak at the 4th hour, while the administration of quinidine galactane sulphate gave a high blood concentration until the 8th hour, the rate of reduction in concentration after the 4th hour being much less than with quinidine sulphate. At the 8th hour the blood concentration of quinidine obtained with galactane sulphate was approximately double that found with quinidine sulphate.

The experimentally observed results were confirmed by clinical trials with quinidine galactane sulphate and quinidine arabogalactane. Analyses of human blood showed that the blood concentrations obtained were maintained at a high level for at least 8 hours after the administration of these products, while they fell rapidly when quinidine sulphate was given. Clinical observations, relating in particular to cardiac arrhythmia, showed the therapeutic value of the former salts which enable a more uniform action to be obtained with a more widely spaced dosage.

Figure 2:
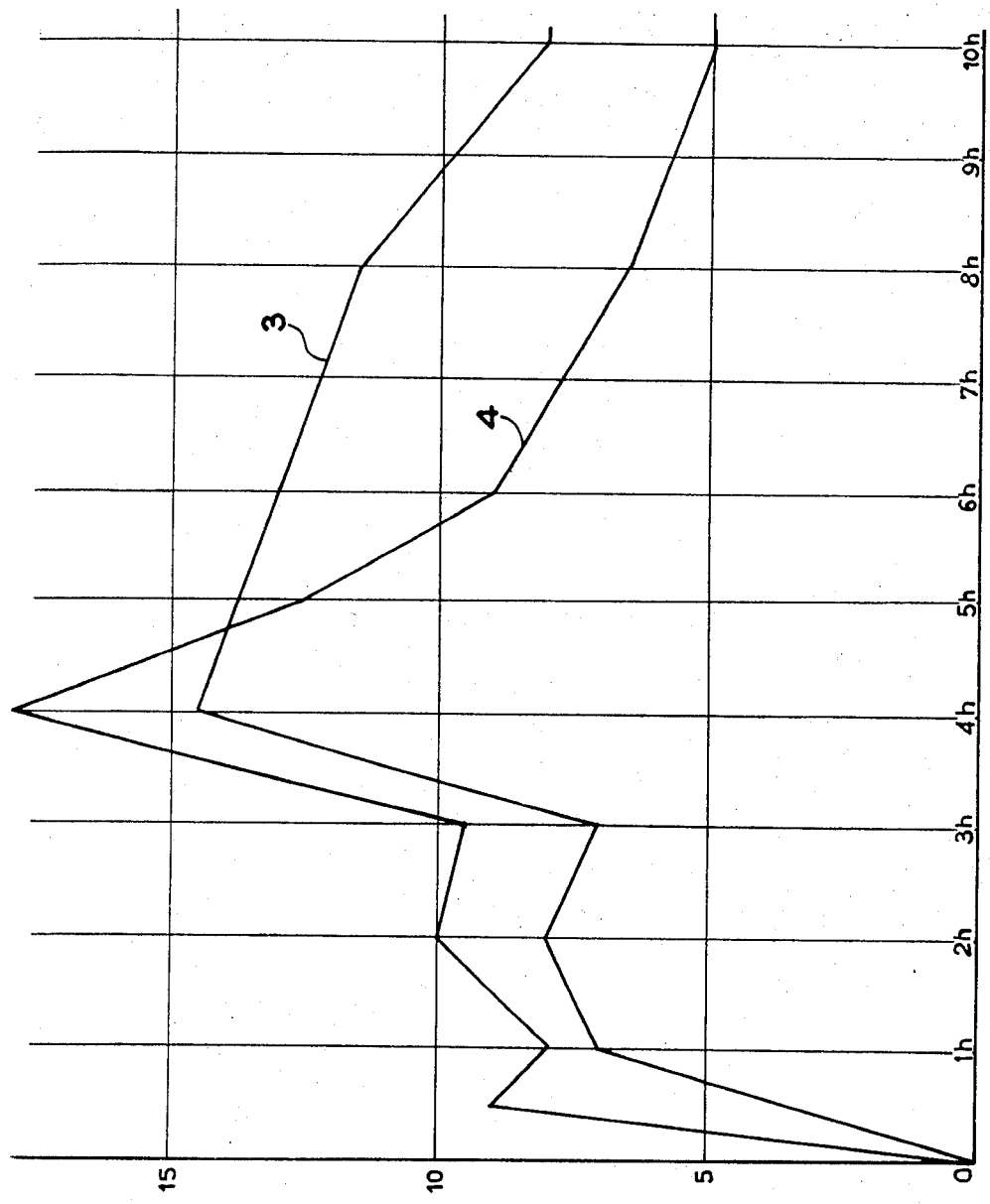
FIG. 2 shows by way of comparison the quinine content of the blood after the administration of equivalent doses of quinine galactane sulphate (compound of Example 2) and quinine sulphate, the curves being drawn according to trial process B hereinafter.

With reference to FIG. 2, trial process B for the determination of quinine in the blood was similar to process A. Both quinine and quinidine have an absorption maximum at $\lambda= 350$ mµ in solution in 2N sulphuric acid. In this trial, 980 mg/kg of quinine galactane sulphate and 460 mg/kg of quinine sulphate (or in both cases 400 mg of base) were given. Curves 3 and 4 show the variation in the quinine level in the blood in µg/ml in dependence on the time in hours after giving quinine galactane sulphate (curve 3) and quinine sulphate (curve 4). It is clearly seen from the curves that with quinine sulphate the blood level fell rapidly after a maximum at the end of 4 hours, while this level remained high until the 8th hour with quinine galactane sulphate.

Figure 3:
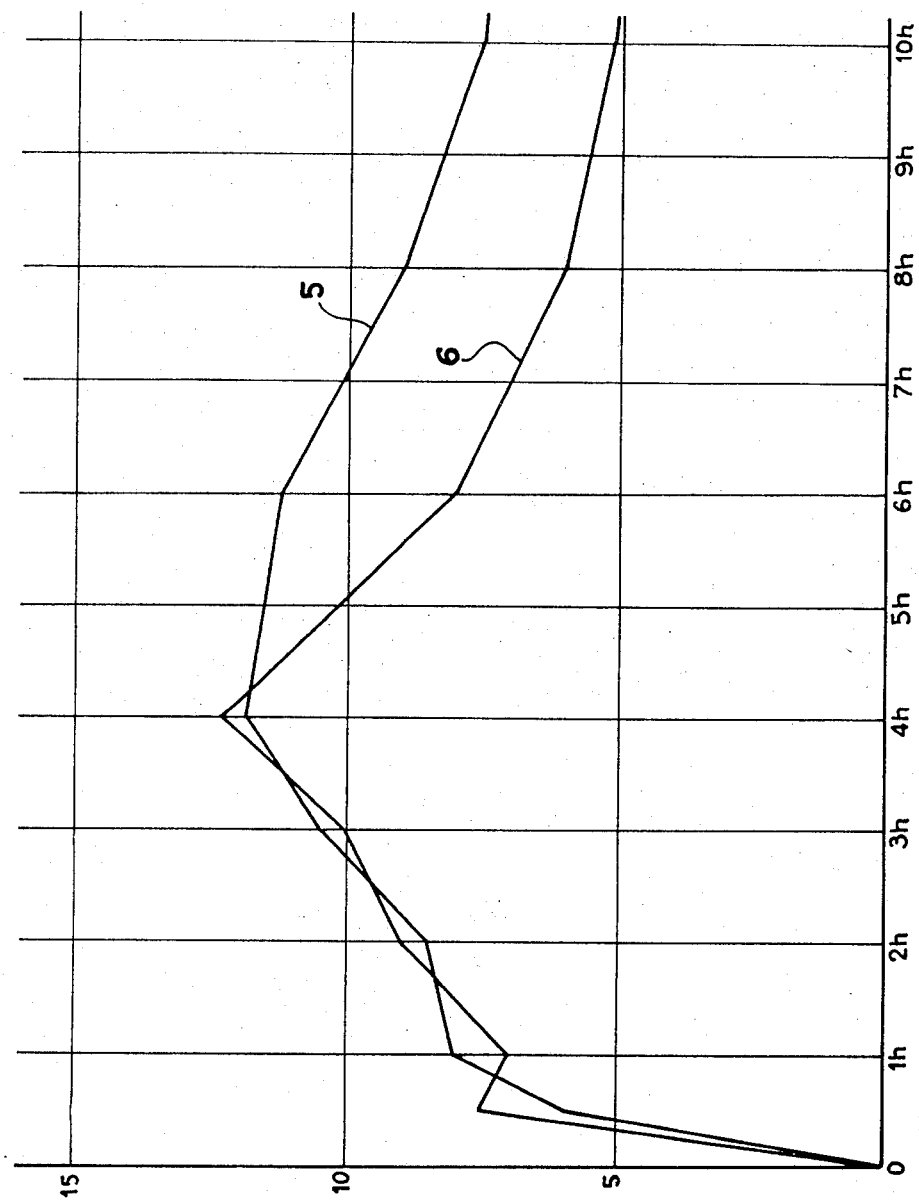
FIG. 3 shows by way of comparison the hydroquinidine content of the blood after the administration of equivalent doses of hydroquinidine galactane sulphate (compound of Example 4) and hydroquinidine sulphate, the curves being drawn according to trial process C hereinafter.

With reference to FIG. 3, trial process C for the determination of hydroquinidine in the blood was similar to process A. Spectrophotometric analyses at $\lambda= 350$ mµ were also carried out. In this case, the oral dose was 1.04 g/kg of hydroquinidine galactane sulphate and 0.459 g/kg of hydroquinidine sulphate (or in both cases 400 mg of base). Curve 5 shows the variation in the level of hydroquinidine in the blood after giving the galactane sulphate, while curve 6 shows the administration of the sulphate. A comparison of the curves shows the favourable effect of galactane sulphate on the maintenance of high concentrations in the blood for a prolonged period.

Figure 4:
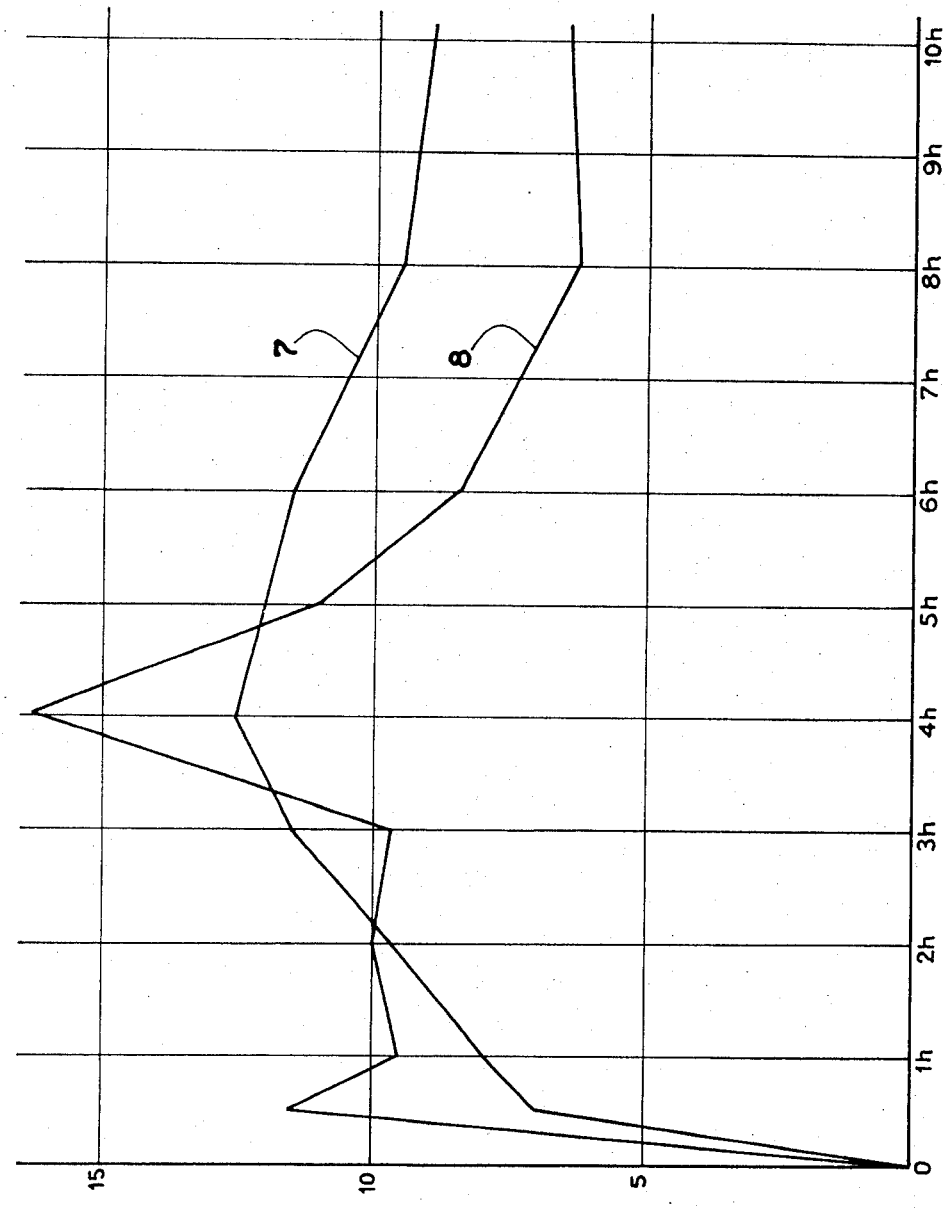
FIG. 4 shows by way of comparison the quinidine content of the blood after the administration of equivalent doses of quinidine arabogalactane (compound of Example 10) and quinidine sulphate, the curves being drawn according to trial process A.

Finally, the curves of FIG. 4 were plotted in the same way as in FIG. 1 after oral administration of 766 mg/kg of quinidine arabogalactane sulphate (curve 7) and 500 mg/kg of quinidine sulphate (curve 8) (or in both cases 435 mg of base); it will be seen that high blood levels were maintained longer with the arabogalactane sulphate salt than with the sulphate salt.

Similar results have been obtained with other cinchona alkaloids so that the blood level maintenance effect obtained by the use of their salts with polysaccharide sulphates may be utilised whenever these various alkaloids are indicated.

These salts must be given orally and may be offered in the form of tablets, lozenges, capsules or the like.

A tablet formulation is given below by way of example:

| | |
|---|---|
| Quinidine galactane sulphate | 0.570 g |
| Rhodopas M | 0.0114 g |
| Precirol | 0.0057 g |

The active principle is granulated by conventional methods with a 10 percent solution of Rhodopas M in methanol, Precirol is added to the dry granulate and the latter is then compressed into tablets.

The dosages expressed in alkaloid base per dose unit are similar to those that are commonly used. The number of doses per 24 hours may, however, be reduced since the blood levels of the product are maintained for a longer time and more uniformly above the threshold of activity. The number of doses may, in general, be half the usual.

What we claim is:

1. A salt of a cinchona alkaloid and a polysaccharide sulphate, the alkaloid being selected from the group consisting of quinidine, hydroquinidine, quincine, cinchonicine hydroquinicine and hydrocinchonicine and the polysaccharide sulphate being selected from the group consisting of galactane sulphate or carraghenate, galactoglucane sulphate or furcellarene, dextran sulphate and arabogalactane sulphate.
2. Quinidine galactane sulphate.
3. Quinicine galactane sulphate.
4. Hydroquinidine galactane sulphate.
5. Cinchonicine galactane sulphate.
6. Hydrocinchonicine galactane sulphate.
7. Hydroquinicine galactane sulphate.
8. Quinidine galactoglucane sulphate.
9. Quinidine dextran sulphate.
10. Quinidine arabogalactane sulphate.
11. Quinicine arabogalactane sulphate.
12. Hydroquinidine arabogalactane sulphate.
13. Hydroquinicine arabogalactane sulphate.
14. Cinchonicine arabogalactane sulphate.
15. Hydrocinchonicine arabogalactane sulphate.

* * * * *

UNITED STATES PATENT OFFICE
CERTIFICATE OF CORRECTION

Patent No. 3,862,123          Dated January 21, 1975

Inventor(s) Rene Tixier

It is certified that error appears in the above-identified patent and that said Letters Patent are hereby corrected as shown below:

On the Title Page, in item [73] "Sageras" should read -- Sogeras --

Signed and sealed this 8th day of April 1975.

(SEAL)
Attest:

RUTH C. MASON
Attesting Officer

C. MARSHALL DANN
Commissioner of Patents
and Trademarks